United States Patent
Da Silva Simoes De Carvalho et al.

(10) Patent No.: US 11,282,148 B2
(45) Date of Patent: Mar. 22, 2022

(54) METHOD AND DEVICE FOR AUTOMATIC INTEGRATION OF FARM CLIMATE AND BIOMETRIC VARIABLES

(71) Applicants: Jose Miguel Da Silva Simoes De Carvalho, Lisbon (PT); Miguel Antonio Damas De Matos, Liboa (PT); Samuel Carlos Ribeiro Alves Da Silva, Liboa (PT)

(72) Inventors: Jose Miguel Da Silva Simoes De Carvalho, Lisbon (PT); Miguel Antonio Damas De Matos, Liboa (PT); Samuel Carlos Ribeiro Alves Da Silva, Liboa (PT)

(*) Notice: Subject to any disclaimer, the term of this patent is extended or adjusted under 35 U.S.C. 154(b) by 40 days.

(21) Appl. No.: 16/757,453

(22) PCT Filed: Oct. 18, 2018

(86) PCT No.: PCT/IB2018/058105
§ 371 (c)(1),
(2) Date: Apr. 20, 2020

(87) PCT Pub. No.: WO2019/077551
PCT Pub. Date: Apr. 25, 2019

(65) Prior Publication Data
US 2021/0019841 A1    Jan. 21, 2021

(30) Foreign Application Priority Data
Oct. 18, 2017   (PT) .................................... 110363

(51) Int. Cl.
*G06Q 50/02*    (2012.01)
*H04L 29/08*    (2006.01)
(Continued)

(52) U.S. Cl.
CPC ............. *G06Q 50/02* (2013.01); *H04L 67/12* (2013.01); *H04L 69/04* (2013.01)

(58) Field of Classification Search
CPC .... A01B 79/005; A01D 41/1274; A01K 1/00; G01W 1/10; G05B 15/02; G06Q 50/02;
(Continued)

(56) References Cited

U.S. PATENT DOCUMENTS 10,142,196 B1* 11/2018 Stamatakis ............. H04L 43/04
2002/0005895 A1* 1/2002 Freeman ................. H04N 5/772
348/143
(Continued)

FOREIGN PATENT DOCUMENTS

WO        2017176733 A1     10/2017

OTHER PUBLICATIONS

Nakamura Yuichi et al: "CSDA: Rule-based complex sensor data aggregation system for M2M gateway", 2015 Eighth International Confrence on Mobile Computing and Ubiquitous Networking (ICMU), IPSJ, Jan. 20, 2015.

*Primary Examiner* — Stephen R Burgdorf
(74) *Attorney, Agent, or Firm* — Mark M. Friedman

(57) ABSTRACT

The present invention relates to a device for use in the farming sector. More specifically, the invention relates to remotely obtaining farm climate and biometric variables. It is an object of the present invention to provide a method for automatic integration of farm climate and/or biometric variables which comprises: obtaining data on a set of farm climate and/or biometric variables from a controller, equalizing the collected data on a set of farm climate and/or biometric variables to pre-defined units, and transmitting such equalized data to a remote server. It thus provides an automatized way of integrating in a web connected environment information from different farm climate and/or
(Continued)

biometric controllers. It is also an object of the present invention to provide a device which implements the method and which may comprise a room connection unit (104), a data processing unit (103), a non-volatile data buffering unit (102) and a remote connection unit (101).

12 Claims, 2 Drawing Sheets

(51) Int. Cl.
*H04L 29/06* (2006.01)
*H04L 67/12* (2022.01)
*H04L 69/04* (2022.01)

(58) Field of Classification Search
CPC ......... G06Q 50/20; H04L 67/12; H04L 67/42; H04L 69/04; Y02A 40/25
USPC ......................................................... 340/540
See application file for complete search history.

(56) References Cited

U.S. PATENT DOCUMENTS

| | | | |
|---|---|---|---|
| 2013/0003382 A1* | 1/2013 | Ohura .................... | A01G 9/249 362/253 |
| 2013/0215850 A1* | 8/2013 | Zakrzewski ...... | H04W 72/1221 370/329 |
| 2014/0115958 A1* | 5/2014 | Helene .................. | A01G 31/06 47/17 |
| 2015/0006450 A1 | 1/2015 | Ferre et al. | |
| 2015/0106434 A1* | 4/2015 | Fiene .................. | G06Q 10/063 709/203 |
| 2015/0310720 A1* | 10/2015 | Gettings .............. | G08B 29/188 340/540 |
| 2016/0048515 A1* | 2/2016 | Mullins ............... | G06F 16/9537 707/737 |
| 2016/0061992 A1* | 3/2016 | Miller ..................... | G01W 1/10 702/3 |
| 2017/0111210 A1 | 4/2017 | Chakrobartty et al. | |
| 2017/0127622 A1* | 5/2017 | Hong ...................... | A01G 9/24 |
| 2017/0278039 A1 | 9/2017 | Saito et al. | |
| 2019/0133026 A1* | 5/2019 | Seaman ................. | G06Q 50/02 |

* cited by examiner

METHOD AND DEVICE FOR AUTOMATIC INTEGRATION OF FARM CLIMATE AND BIOMETRIC VARIABLES

FIELD OF THE INVENTION

The present invention relates to a device for use in the farming sector. More specifically, the invention relates to remotely obtaining farm climate and biometric variables.

PRIOR ART

A farm may be a holding of any size, from a fraction of a hectare to several thousand hectares. Depending on the farm's capacity, several sorts of activities may take place, intensive employing of various resources occurs, like of farm equipment and farm animals. Managing all the resources manually in a farm is difficult and often leads to wastage and low productivity.

Controlling, monitoring and managing the farm resources are the key challenges in the farm management sector. As the conventional devices are designed with the premise of local usage, controlling, monitoring and reporting are also based on the same premise of local usage. Conventional devices are designed without adequate support for controlling, monitoring or reporting from a remote location, such that end users can remotely access the farm data from any mobile device, including a computer, a tablet or smartphone.

Known devices in the art are thus designed to be installed in a farm for monitoring different aspects, such as herd management, parlours status, temperature detection, chillers, sheds and other farm equipment. The major disadvantage with such kind of devices is that they fail to work in tandem and to provide an integrated view of the farm or farms.

There are also devices known in the art which are deployed in a farm to act solely as a receiver for one market manufacturer and, apart from this, these devices do not interact with any other manufacturer or serve any other purpose. Hence, deploying such type of devices in a farm which may act solely with one market manufacturer can be ineffective, especially for bigger production groups where different climate and biometric controllers from different manufacturers have been deployed over the years.

Hence, there is a need of a device that may seamlessly connect to farm climate or biometric controllers from different manufacturers, and communicate aggregated data to the producer, increasing information quantity and quality and allowing for productivity increase by well informed decisions.

SUMMARY OF THE INVENTION

It is an object of the present invention to provide method for automatic integration of farm climate and/or biometric variables which comprises the steps of:
  obtaining, from a farm climate and/or biometric controller, data on a set of farm climate and biometric variables, such set of farm climate and/or biometric variables being collected by a set of sensors connected to the farm climate and/or biometric controller, such obtainment being preferably performed by a room connection unit;
  equalizing the collected data on a set of farm climate and/or biometric variables to pre-defined units, thereby obtaining equalized data which is of lesser size that the collected data;
  transmitting such equalized data to a remote server.

The methodology of the present invention enables to gather data from any manufacturer room climate or biometric controller, by equalizing such data and forwarding it to a remote server such as a cloud-based system for further analysis, eliminating the need for premise-based systems. It thus provides an automatized way of integrating in a web connected environment information from different farm climate and/or biometric controllers which are otherwise i) not able to be remotely addressed or ii) data obtained therefrom is not able to be compared with data other controllers, which are based on different standards. Furthermore, the method of the present invention enables efficient remote communication, since equalized data is of lesser size that the collected data.

Collected data is equalized, in particular by converting the physical quantities and magnitudes to a universal scale, enabling the data to be then used in a cloud application without additional processing.

In an advantageous configuration of the method of the present invention, said equalization is dependent on the obtained data, in particular on the number of variables and on data points associated with each variable. Moreover, equalization of the collected data may further comprise the determination of preset parameters based on more than one collected variable, for example, calculating the value of the thermal sensation from a given temperature and humidity. In both cases, equalization provides an efficient processing of collected data for further transmission, as well as an automatic adaptation to the field conditions, related to the respective farm climate and/or biometric controller.

In yet another inventive aspect of the method of the present invention, prior to obtaining, from a farm climate and/or biometric controller, data on a set of farm climate and biometric variables, a recognition of the protocol with which such farm climate and/or biometric controller operates is performed. The subsequent obtainment of the data on a set of farm climate and/or biometric variables thus being performed based on such recognised protocol. The automatic recognition of the operation protocol of the farm climate and/or biometric controller provides for additional and automatic adaptation to the field conditions. Preferably, said recognition of the protocol is performed by one or more of the following: questioning a farm climate and/or biometric controller with requests for known controllers, detecting patterns of byte sequences in messages from a farm climate and/or biometric controller and/or analyzing the physical medium of communication used and transmission speeds in a communication a farm climate and/or biometric controller.

It is also an object of the present invention to provide device for automatic integration of farm climate and/or biometric variables wherein it is configured to implement the method of the present invention, in any of the herein described embodiments. Preferably, such device comprises:
  a room connection unit configured to obtain, from a farm climate and/or biometric controller, data on a set of farm climate and biometric variables, such set of farm climate and/or biometric variables being collected by a set of sensors connected to the farm climate and/or biometric controller,
  a data processing unit configured to equalize the collected data on a set of farm climate and/or biometric variables to pre-defined units, thereby obtaining equalized data which is of lesser size that the collected data,
  a remote connection unit configured to transmit such equalized data to a remote server.

The present invention eliminates all the drawbacks of the prior art by providing a method and a device for on demand and historical cloud-based monitoring of farm installations, wherein the device may comprise a room connection unit (104), a data processing unit (103), a non-volatile data buffering unit (102) and a remote connection unit (101).

Since the data collected from the farm equipment—farm climate and/or biometric controller—is transmitted to a remote system hosted on cloud environment, high end computing and analytics of the data is possible, which results in better farm management, increased productivity and reduced labour costs. Furthermore, the data can be accessed from any remote place via Internet.

DETAILED DESCRIPTION

Figure 1:
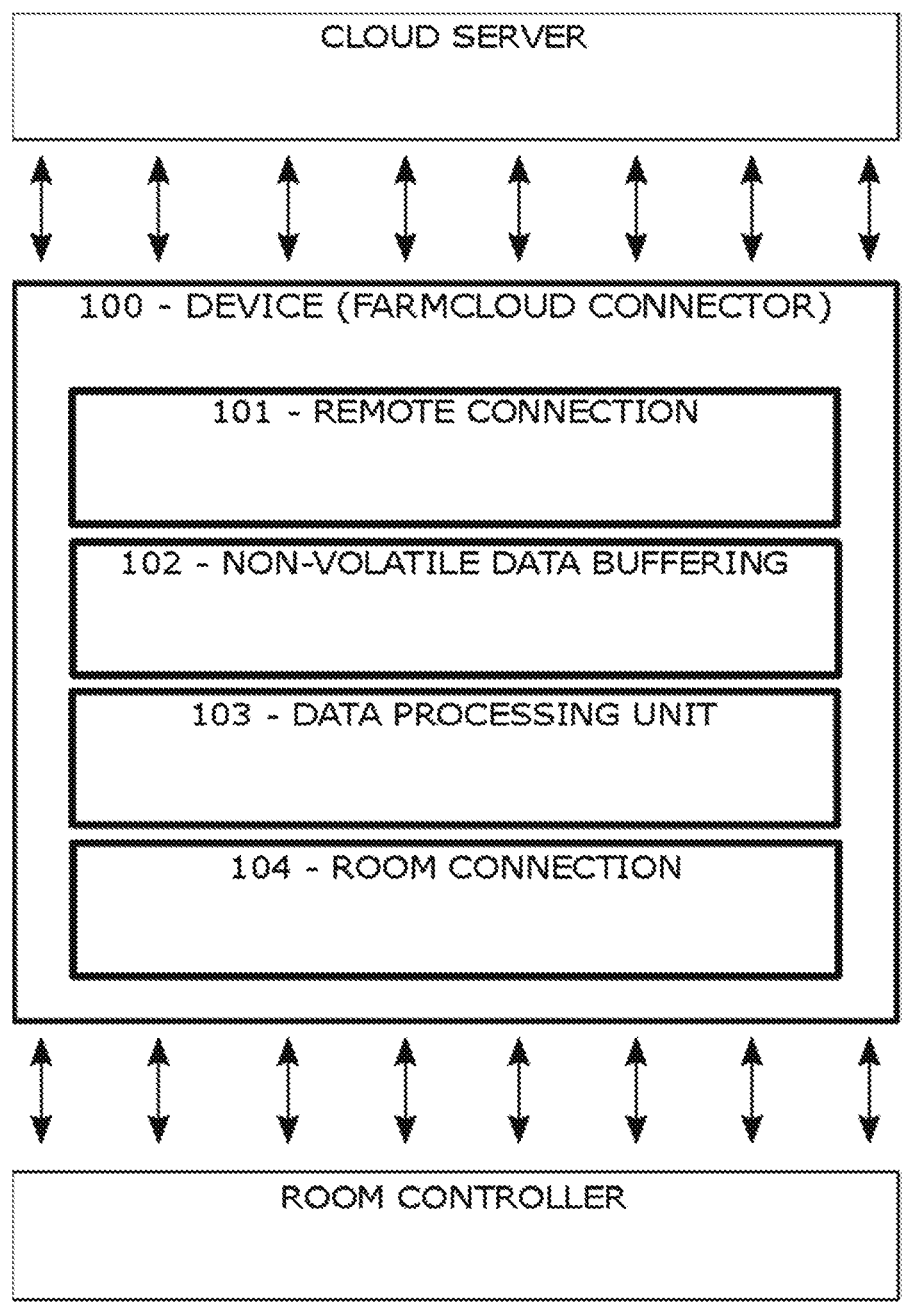
FIG. 1—representation of an embodiment of the device of the present invention, in particular through a schematic block diagram of a system for monitoring farm rooms which comprises the device.

The more general and advantageous configurations of the present invention are described in the Summary of the invention. Such configurations are detailed below in accordance with other advantageous and/or preferred embodiments of implementation of the present invention.

As referred, the device of the present invention may comprise a room connection unit (104), a data processing unit (103), a non-volatile data buffering unit (102) and a remote connection unit (101). The room connection unit (104) interfaces with the farm climate and biometric controllers, exchanging data variables and readings with the climate and biometric controller. The data processing unit (103) equalizes the data collected by the room connection unit (104), converting the physical quantities and magnitudes to a universal scale, enabling data to be then used in the cloud application without additional processing. The non-volatile data buffering unit (102) stores data arising from data processing unit (103) in a non-volatile memory. The remote connection unit (101) allows communication between the device (100), specially its non-volatile data buffering unit (102), and a system hosted on cloud environment, exchanging the data between room and cloud.

In an aspect of the method of the present invention, collected data and/or equalized data is stored in a non-volatile data buffering unit, preferably a FLASH or EEPROM based memory unit. Preferably, said storing of equalized data in the non-volatile data buffering unit is performed such data is circularly overwritten, thereby extending memory lifetime.

In an inventive aspect, which provides an efficient management of power consumption, said transmission of equalized data is performed actively and periodically, such periodicity being pre-set or dependent on the amount of data.

Optionally, data is obtained from the farm climate and/or biometric controller by means of one of the following technologies: Ethernet, USB, RS-485, RS-232, I2C, SPI, 1WIRE, Bluetooth, Wi-Fi, Infrared, ZigBee, an ISM band RF (Industrial, Scientific and Medical band Radio Frequency) or NFC (Near Field Communication).

Additionally, the referred transmission of equalized data to a remote server is performed by at least one of the following technologies: Ethernet, ADSL, GSM, EDGE, CDMA, 3GPP or 4GLTE and the like, such transmission being preferably performed by a remote connection unit.

Preferably, prior to said transmission of equalized data, the equalized data is compressed and encrypted.

In another aspect of the method of the present invention, said remote server consists of a cloud server, the transmission being performed through a TCP/IP socket.

The farm climate and/or biometric variables may be in respect of several different aspects to be monitored, such as temperature, humidity, biometric data relating to a farm animal, information on heat detection, information on a chiller device information on herd management, and/or information on farm equipment such as a shed or a production room, as obtained from sensors which form a farm climate and/or biometric variables monitoring installation.

Preferably, the farm animals being monitored consist of chickens or pigs, to which said biometric data thus relates.

Preferably, the device of the present invention further comprises a non-volatile data buffering unit configured to store collected data and/or equalized data, such non-volatile data buffering unit preferably a FLASH or EEPROM based memory unit.

An embodiment of the device of the present invention is subsequently described. It consists of a device for cloud-based monitoring of farm rooms, wherein it comprises a remote connection unit, non-volatile data buffering unit, data processing unit and a room connection unit. The room connection unit allows communication of data between the device and a farm climate and/or biometric controller. The data processing unit equalizes data collected from the climate or biometric controller. The non-volatile data buffering unit stores the equalized data. The remote connection unit allows communication between the device and a system hosted on a cloud environment, exchanging the data between room and cloud.

The remote connection unit has typically a cellular network module which enables communicating the data with the system hosted on a cloud environment over the Internet.

FIG. 1 is a block diagram which illustrates the device used for cloud-based monitoring of farm climate and biometric controllers in accordance with one embodiment of the invention. The device (100) comprises a room connection unit (104), a data processing unit (103), a non-volatile data buffering unit (102) and a remote connection unit (101).

The room connection unit (104) interfaces with the farm climate and biometric controllers, exchanging data variables and readings with the climate and biometric controllers, using typically one of the following technologies: ETHERNET, USB, RS485, RS232, I2C, SPI, 1WIRE, Bluetooth, Wi-Fi, Infrared, ZigBee, ISM band RF or NFC.

The data processing unit (103) equalizes the data collected by the room connection unit (104), converting the physical quantities and magnitudes to a universal scale, enabling data to be then used in the cloud application without additional processing.

The non-volatile data buffering unit (102) stores data arising from data processing unit (103) in a non-volatile memory, typically FLASH or EEPROM. The data is circularly overwritten in the buffer to reduce the use of each memory cell.

The remote connection unit (101) allows communication between the device (100), specially its non-volatile data buffering unit (102), and a system hosted on cloud environment, exchanging the data between room and cloud. The remote connection unit (101) can support at least one of the following technologies: ETHERNET, ADSL, GSM, EDGE, CDMA, 3GPP, 4GLTE and the like.

The device (100) is configured to send all the room data collected and stored (102) to the cloud-based system using the remote connection unit (101) which allows high end computing and analytics of the data, resulting in improved farm management, decreased animal mortality, increased productivity and reduced labour costs. Furthermore, the room data collected from the farm climate and biometric controllers can also be accessed by an end user from anywhere over the Internet using various Internet enabled devices such as computers, tablets or smart phones.

The device (100) delivers data which enables better decision making by integrating information from the farm and other information available over the Internet such as weather, agriculture alerts, and spread of epidemics across farms, etc.

Figure 2:
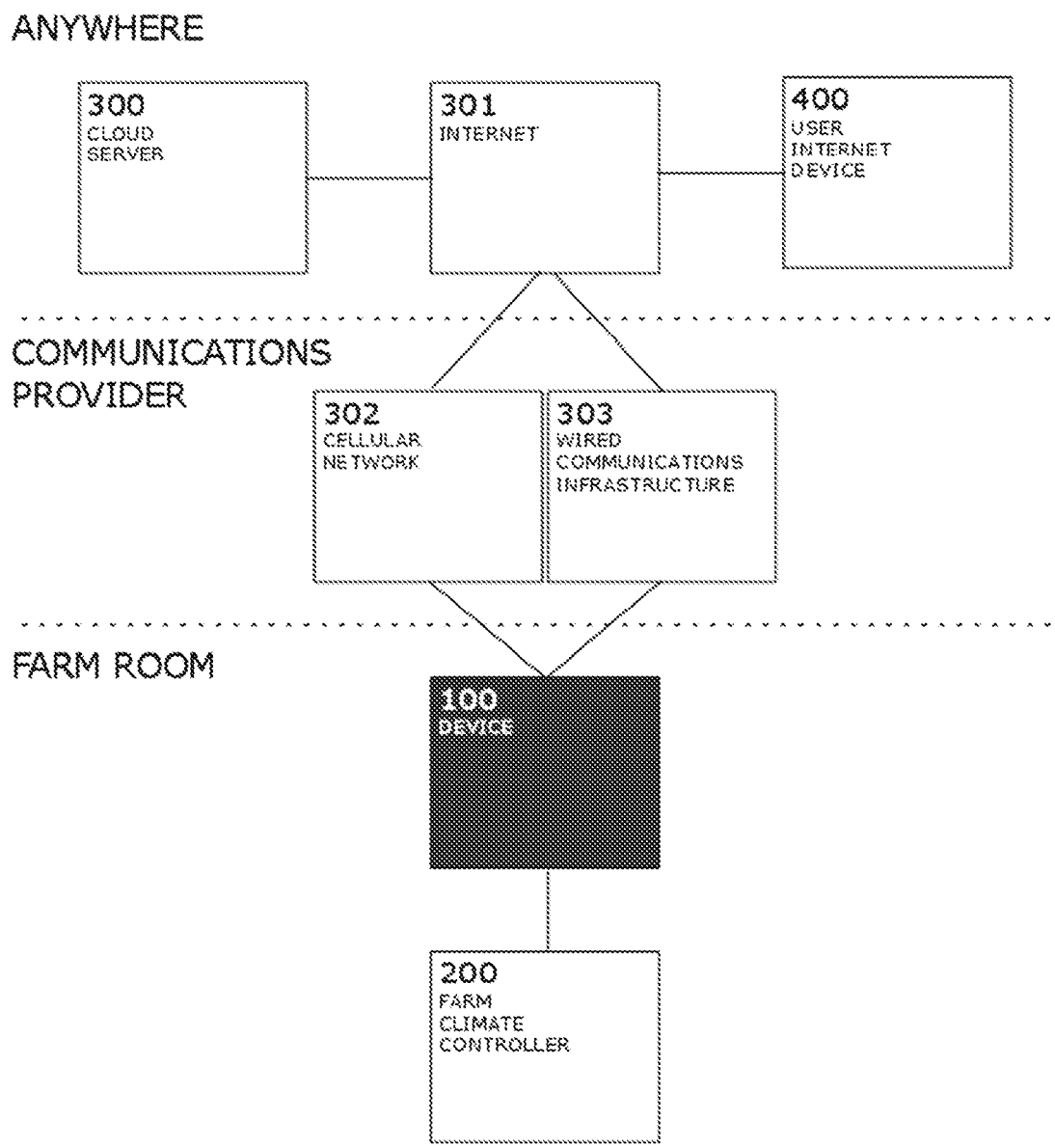
FIG. 2—representation of a perspective view of a livestock room, illustrating a typical system for monitoring a farm facility, such system comprising the device of the present invention.

FIG. 2 shows a block diagram of a system for cloud-based monitoring and control of farm equipment according to one embodiment of the invention. The system includes a farm climate or biometric controller (200), cloud-based server (300) and the device (100) capable of communicating with the cloud-based server (300) via the Internet (301) through a cellular network (302) or wire communication infrastructure (303). The device (100) is capable of communicating with the climate or biometric controller (200), continuously collecting the data and storing it on the non-volatile data buffer. The device (100) periodically sends the buffered data to the cloud-based server (300) which serves an application for remote access by the user to the data, using an Internet enabled device (400).

Since the data collected from the farm climate or biometric controller (200) is transmitted to the cloud-based system (300), high end computing and analytics of the data is possible, which results in improved farm management, decreased animal mortality, increased productivity and reduced labour costs. Furthermore, the data can be accessed from any remote place via the Internet. The device is capable of communicating with both wired and wireless devices, and so simplifying connection of additional equipment to the device.

The description of the invention is merely exemplary in nature and, thus, variations that do not depart from the gist of the invention are intended to be within the scope of the invention. Such variations are not to be regarded as a departure from the spirit and scope of the invention. So it is to be understood, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

The invention claimed is:
1. A method for automatic integration of farm climate and/or biometric variables, the method comprising:

obtaining, from each of a plurality of farm climate and/or biometric controllers, data on a set of farm climate and biometric variables, such set of farm climate and/or biometric variables being collected by a set of sensors connected to the farm climate and/or biometric controller, such obtainment being preferably performed by a room connection unit;

equalizing the collected data on a set of farm climate and/or biometric variables to pre-defined units, the equalization dependent on the obtained data, in particular on the number of variables and data points associated with each variable, thereby obtaining equalized data which is of lesser size than the collected data, the equalizing performed by a data processing unit converting at least one of physical quantities and magnitudes of the collected data to a universal scale;

storing equalized data in a non-volatile data buffering unit, preferably a FLASH or EEPROM based memory unit such that the equalized data is circularly overwritten, thereby extending memory lifetime; and transmitting such equalized data to a remote server;

wherein the plurality of farm climate and/or biometric controllers comprise different controllers which provide farm climate and/or biometric data based on different standards.

2. The method according to claim 1 wherein equalization of the collected data further comprises the determination of preset parameters based on more than one collected variable, including calculating the value of the thermal sensation from a given temperature and humidity.

3. The method according to claim 1 wherein, prior to obtaining, from a farm climate and/or biometric controller, data on a set of farm climate and biometric variables, a recognition of the protocol with which such farm climate and/or biometric controller operates is performed, the subsequent obtainment of the data on a set of farm climate and/or biometric variables thus being performed based on such recognized protocol.

4. The method according to claim 3 wherein said recognition of the protocol is performed by one or more of the following: questioning a farm climate and/or biometric controller with requests for known controllers, detecting patterns of byte sequences in messages from a farm climate and/or biometric controller and/or analyzing the physical medium of communication used and transmission speeds in a communication with a farm climate and/or biometric controller.

5. The method according to claim 1 wherein said transmission of equalized data is performed actively and periodically, such periodicity being preset or dependent on the amount of data.

6. The method according to claim 1 wherein the data is obtained from the farm climate and/or biometric controller by means of one of the following technologies: Ethernet, USB, RS-485, RS-232, I2C, SPI, 1WIRE, Bluetooth, Wi-Fi, Infrared, ZigBee, an ISM band RF or NFC.

7. The method according to claim 1 wherein the referred transmission of equalized data to a remote server is performed by at least one of the following technologies: Ethernet, ADSL, GSM, EDGE, CDMA, 3GPP or AGLTE, such transmission being preferably performed by a remote connection unit.

8. The method according to claim 1 wherein, prior to said transmission of equalized data, the equalized data is compressed and encrypted.

9. The method according to claim 1 wherein said remote server consists of a cloud server, the transmission being performed through a TCP/IP socket.

10. The method according to claim 1 wherein said farm climate and/or biometric variables consist of temperature, humidity, biometric data relating to a farm animal, information on heat detection, information on a chiller device information on herd management, and/or information on a farm equipment such as a shed or a production room, as obtained from sensors which form a farm climate and/or biometric variables monitoring installation.

11. A device for automatic integration of farm climate and/or biometric variables configured to implement a method for automatic integration of farm climate and/or biometric variables, the method comprising:
   obtaining, from each of a plurality of farm climate and/or biometric controllers, data on a set of farm climate and biometric variables, such set of farm climate and/or biometric variables being collected by a set of sensors connected to the farm climate and/or biometric controller, such obtainment being preferably performed by a room connection unit;
   equalizing the collected data on a set of farm climate and/or biometric variables to pre-defined units, the equalization dependent on the obtained data, in particular on the number of variables and data points associated with each variable, thereby obtaining equalized data which is of lesser size than the collected data, the equalizing performed by a data processing unit converting at least one of physical quantities and magnitudes of the collected data to a universal scale;
   storing equalized data in a non-volatile data buffering unit, preferably a FLASH or EEPROM based memory unit such that the equalized data is circularly overwritten, thereby extending memory lifetime; and
   transmitting such equalized data to a remote server;
   wherein the plurality of farm climate and/or biometric controllers comprise different controllers which provide farm climate and/or biometric data based on different standards.

12. The device according to claim 11, wherein it comprises:
   a room connection unit configured to obtain, from a farm climate and/or biometric controller, data on a set of farm climate and biometric variables, such set of farm climate and/or biometric variables being collected by a set of sensors connected to the farm climate and/or biometric controller,
   a data processing unit configured to equalize the collected data on a set of farm climate and/or biometric variables to pre-defined units, thereby obtaining equalized data which is of lesser size that the collected data,
   a remote connection unit configured to transmit such equalized data to a remote server.

* * * * *